US010316916B2

(12) United States Patent
    Fischl

(10) Patent No.: US 10,316,916 B2
(45) Date of Patent: Jun. 11, 2019

(54) DISC BRAKE, BRAKE CALIPER AND BRAKE PAD SET FOR A DISC BRAKE

(71) Applicant: KNORR-BREMSE Systeme fuer Nutzfahrzeuge GmbH, Munich (DE)

(72) Inventor: Tobias Fischl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/358,258

(22) Filed: Nov. 22, 2016

(65) Prior Publication Data

US 2017/0074338 A1 Mar. 16, 2017

Related U.S. Application Data

(63) Continuation of application No. PCT/EP2015/061189, filed on May 20, 2015.

(30) Foreign Application Priority Data

May 26, 2014 (DE) .................. 10 2014 107 401

(51) Int. Cl.
    *F16D 65/56* (2006.01)
    *F16D 65/092* (2006.01)
    (Continued)

(52) U.S. Cl.
    CPC ....... *F16D 65/568* (2013.01); *F16D 55/2265* (2013.01); *F16D 65/0068* (2013.01);
    (Continued)

(58) Field of Classification Search
    CPC .............. F16D 65/568; F16D 65/095; F16D 2055/0016; F16D 55/2265; F16D 65/0068;
    (Continued)

(56) References Cited

U.S. PATENT DOCUMENTS 4,606,438 A * 8/1986 Mathias ................ F16D 65/092
                                                    188/250 B
4,773,511 A * 9/1988 Giering ................ F16D 55/227
                                                    188/250 R
(Continued)

FOREIGN PATENT DOCUMENTS

DE        197 12 274 A1    10/1997
DE        197 29 024 C1    1/1999
(Continued)

OTHER PUBLICATIONS

International Search Report (PCT/ISA/210) issued in PCT Application No. PCT/EP2015/061189 dated Sep. 25, 2015 with English translation (Six (6) pages).

(Continued)

*Primary Examiner* — Thomas J Williams
*Assistant Examiner* — Mariano Sy
(74) *Attorney, Agent, or Firm* — Crowell & Moring, LLP

(57) ABSTRACT

A disc brake, preferably pneumatically actuated, in particular for a motor vehicle, including a brake disc with a brake disc axis, a brake caliper, in particular a sliding caliper, with a brake application section and a caliper back which are connected via tension struts, and at least two brake pads with in each case one brake pad carrier. Of the brake pads, an application-side brake pad is assigned to the brake application section and a back-side brake pad is assigned to the caliper back. The brake pad carrier of the back-side brake pad and the caliper back of the brake caliper are in contact via at least one pair of contact surfaces. One contact surface of the at least one pair of contact surfaces is an end surface of a projection, and the other contact surface of the at least one pair of contact surfaces is a bottom surface of a recess.

11 Claims, 8 Drawing Sheets

(51) Int. Cl.
  *F16D 65/095* (2006.01)
  *F16D 55/2265* (2006.01)
  *F16D 65/00* (2006.01)
  *F16D 125/26* (2012.01)
  *F16D 125/32* (2012.01)
  *F16D 55/00* (2006.01)

(52) U.S. Cl.
  CPC ......... *F16D 65/092* (2013.01); *F16D 65/095* (2013.01); *F16D 65/567* (2013.01); *F16D 2055/0016* (2013.01); *F16D 2125/26* (2013.01); *F16D 2125/32* (2013.01)

(58) Field of Classification Search
  CPC .. F16D 65/092; F16D 65/567; F16D 2125/26; F16D 2125/32
  USPC ...................... 188/71.9, 250 R, 250 B, 73.35
  See application file for complete search history.

(56) References Cited

U.S. PATENT DOCUMENTS

| | | | |
|---|---|---|---|
| 5,343,985 A * | 9/1994 | Thiel | F16D 55/227 188/72.5 |
| 5,582,273 A * | 12/1996 | Baumgartner | F16D 65/18 188/106 F |
| 5,890,566 A | 4/1999 | Yoshida et al. | |
| 6,073,732 A | 6/2000 | Angerfors | |
| 6,250,434 B1 | 6/2001 | Baumgartner et al. | |
| 6,357,559 B1 * | 3/2002 | Madzgalla | F16D 55/224 188/73.32 |
| 7,631,733 B2 * | 12/2009 | Roberts | F16D 55/226 188/73.1 |
| 7,849,977 B2 * | 12/2010 | Gruber | F16D 55/227 188/72.5 |
| 7,926,626 B2 | 4/2011 | Iraschko | |
| 9,358,961 B2 * | 6/2016 | Pahle | F16D 55/226 |
| 2002/0112927 A1 | 8/2002 | Giering et al. | |
| 2003/0094335 A1 | 5/2003 | Baumgartner et al. | |
| 2008/0271963 A1 * | 11/2008 | Macke | F16D 65/092 188/73.1 |
| 2009/0211857 A1 | 8/2009 | Camilo-Martinez et al. | |
| 2009/0218180 A1 | 9/2009 | Roberts et al. | |
| 2012/0085597 A1 * | 4/2012 | Narayanan V | F16D 55/227 188/72.1 |
| 2014/0209418 A1 | 7/2014 | Pahle | |
| 2015/0184710 A1 | 7/2015 | Peschel et al. | |
| 2017/0138426 A1 * | 5/2017 | Schoenauer | F16D 55/226 |

FOREIGN PATENT DOCUMENTS

| | | |
|---|---|---|
| DE | 696 21 032 T2 | 4/2003 |
| DE | 10 2004 037 771 A1 | 3/2006 |
| DE | 10 2005 049 547 A1 | 9/2006 |
| DE | 10 2005 050 581 B3 | 6/2007 |
| DE | 10 2006 034 766 B3 | 1/2008 |
| DE | 10 2009 009 567 A1 | 9/2009 |
| DE | 10 2011 115 214 A1 | 3/2013 |
| GB | 2 332 027 A | 6/1999 |
| JP | 2-26330 A | 1/1990 |
| JP | 2-113030 U | 9/1990 |
| JP | 7-305734 A | 11/1995 |
| JP | 10-30659 A | 2/1998 |
| JP | 2000-145833 A | 5/2000 |
| JP | 2001-511504 A | 8/2001 |
| JP | 2003-532038 A | 10/2003 |
| JP | 2013-87851 A | 5/2013 |
| RU | 2010 138 930 A | 3/2012 |
| WO | WO 2013/045556 A1 | 4/2013 |
| WO | WO 2014/041157 A1 | 3/2014 |

OTHER PUBLICATIONS

German-language Search Report PCT/ISA/237) issued in PCT Application No. PCT/EP2015/061189 dated Sep. 25, 2015 (Five (5) pages).
German-language Office Action issued in counterpart German Application No. 10 2014 107 401.7 dated Feb. 6, 2015 (Eight (8) pages).
International Preliminary Report on Patentability (PCT/IB/338 & PCT/IB/373) issued in PCT Application No. PCT/EP2015/061189 dated Dec. 8, 2016, including English translation (German-language Written Opinion (PCT/ISA/237)) previously filed on Nov. 22, 2016 (Eight (8) pages).
Russian-language Office Action issued in counterpart Russian Application No. 2016150717/11 dated Mar. 7, 2018 with English translation (seventeen (17) pages).
Chinese-language Office Action issued in counterpart Chinese Application No. 201580037620.5 dated Apr. 18, 2018 with English translation (thirteen (13) pages).
Japanese-language Office Action issued in counterpart Japanese Application No. 2016-567660 dated Nov. 21, 2017 with English translation (12 pages).

* cited by examiner

DISC BRAKE, BRAKE CALIPER AND BRAKE PAD SET FOR A DISC BRAKE

CROSS REFERENCE TO RELATED APPLICATIONS

This application is a continuation of PCT International Application No. PCT/EP2015/061189, filed May 20, 2015, which claims priority under 35 U.S.C. § 119 from German Patent Application No. 10 2014 107 401.7, filed May 26, 2014, the entire disclosures of which are herein expressly incorporated by reference.

BACKGROUND AND SUMMARY OF THE INVENTION

The invention relates to a disc brake, preferably pneumatically actuated, in particular for a motor vehicle, having a brake disc with a brake disc axis, a brake caliper, in particular a sliding caliper, with an application section and a caliper back, which are connected via tension struts, and at least two brake pads each having a brake pad carrier. The invention is also concerned with a brake caliper and a brake pad set.

Vehicles and certain technical equipment often use friction brakes to convert kinetic energy. The disc brake is preferred here, especially in the passenger car and commercial vehicle sectors. With the typical design of a disc brake, the disc brake comprises a brake caliper together with an internal mechanism, as well as two brake pads and the brake disc. Forces are introduced to the internal mechanism via a power source, for example via a pneumatically actuated cylinder, are multiplied by an eccentric mechanism and are transmitted as an application force to the brake pads and brake disc via threaded tubes, which are also referred to as threaded plungers, threaded spindles, pressure plungers or the like, together with pressure pieces. The wear on the brake disc and the brake pads is compensated by way of the threaded tubes.

A clearance between the brake pads and the brake disc is referred to as a release clearance. The retardation is significantly affected by the friction coefficient between the brake disc and the brake pad. Since the pads are designed as wearing parts and the friction coefficients are dependent on the rigidity, these pads are generally softer than the brake disc, i.e. the pads undergo a change in pad thickness over their time in use: they wear. Owing to this pad wear and additional disc wear, the release clearance increases. This change in pad thickness gives rise to the need for wear readjustment to compensate for the change and thus establish a constant release clearance.

One example of a readjustment device is described in DE 10 2004 037 771 A1.

The application forces act via two brake pads on the brake disc which, depending on the magnitude of the application force, undergoes a retardation of the rotational movement. The brake pad which lies on the application side of the brake disc is referred to as the application-side brake pad. The other brake pad is located on the other side of the brake disc and is in contact with a caliper back of the brake caliper. During a braking operation, the application-side pad is moved in the direction of the brake disc. As soon as the pad is in contact with the brake disc, the brake caliper is moved by the resulting counterforce in the direction of the brake disc together with the back-side brake pad. If the back-side brake pad now also comes into contact with the brake disc, a braking action is produced.

The back-side brake pad lies against the caliper back of the brake caliper by way of a face-milled surface. This surface is approximately in the shape of the back-side brake pad. The application-side brake pad is pressed against the brake disc, for example via two threaded tube units. It has been found disadvantageous in this case that an uneven wear of the brake pads may arise here.

It is therefore the object of the present invention to provide an improved disc brake.

It is a further object to provide an improved brake caliper.

It is yet another object to provide an improved brake pad set.

These and other objects are achieved by a disc brake, by a brake caliper, and by a brake pad set in accordance with embodiments of the invention.

A disc brake according to the invention, preferably pneumatically actuated, in particular for a motor vehicle, comprises a brake disc with a brake disc axis, a brake caliper, in particular a sliding caliper, with an application section and a caliper back, which are connected via tension struts, and at least two brake pads each having a brake pad carrier. Of the brake pads, an application-side brake pad is assigned to the application section, and a back-side brake pad is assigned to the caliper back. The brake pad carrier of the back-side brake pad and the caliper back of the brake caliper are in contact via at least one pair of contact surfaces. One contact surface of the at least one pair of contact surfaces is an end surface of a projection, and the other contact surface of the at least one pair of contact surfaces is a bottom surface of a recess.

By way of this design, configuration and arrangement of contact surfaces between the back-side brake pad and the caliper back of the brake caliper, uneven wear of the brake pads is significantly reduced.

In one embodiment, the projection with the one contact surface of the at least one pair of contact surfaces and the recess with the other contact surface of the at least one pair of contact surfaces correspond with each other and interact with each other in a form-fitting manner in the installed state. The projection is accommodated in the recess, as a result of which the back-side brake pad is advantageously prevented from unscrewing from the brake caliper.

The projection with the one contact surface of the at least one pair of contact surfaces and the recess with the other contact surface of the at least one pair of contact surfaces can have a circular cross section. As a result, the recess can be produced in a simple manner, for example by drilling and/or hollowing out by turning.

Alternatively, the projection with the one contact surface of the at least one pair of contact surfaces and the recess with the other contact surface of the at least one pair of contact surfaces can have an oval or polygonal cross section. This affords the advantage that a risk of confusion is reduced by means of this unambiguous assignment.

In a further embodiment, the projection with the one contact surface of the at least one pair of contact surfaces is integrally formed on the caliper back of the brake caliper, and the recess with the other contact surface of the at least one pair of contact surfaces is molded into the brake pad carrier of the back-side brake pad. A weight savings is thereby achieved. In addition, the outlay on producing the projections on the caliper back, for example by milling work, is not more complicated in comparison to a conventional face-milled contact surface.

The projection with the one contact surface of the at least one pair of contact surfaces protrudes on the caliper back of the brake caliper from a machined free surface in the direction of the brake disc. The free surface which is produced permits a weight savings.

In a further embodiment, the disc brake furthermore has an application device, preferably with a pivoted brake lever, and at least one threaded tube unit having at least one threaded tube with a center axis. The projection with the one contact surface of the at least one pair of contact surfaces and the recess with the other contact surface of the at least one pair of contact surfaces are arranged with respect to each other coaxially with respect to the center lines thereof and coaxially with respect to the center axis of the at least one threaded tube unit. In this manner, an unfavorable leverage effect is not produced on the back-side brake pad during a braking operation, and therefore uneven wear is significantly reduced.

In an alternative embodiment, the disc brake furthermore has an application device, preferably with a pivoted brake lever, and at least two threaded tube units each having at least one threaded tube with a respective center axis. A first projection with the one contact surface of the at least one pair of contact surfaces and a first recess with the other contact surface of the at least one pair of contact surfaces are arranged with respect to each other coaxially with respect to the center lines thereof and coaxially with respect to the center axis of the one of the at least two threaded tube units, and a second projection with the other contact surface of the at least one pair of contact surfaces and a second recess with the other contact surface of the at least one pair of contact surfaces are arranged with respect to each other coaxially with respect to the center lines thereof and coaxially with respect to the center axis of the other of the at least two threaded tube units. The two individual contact surfaces are arranged in the same center axes as those of the threaded tube units on the application side. This affords the advantage of a reduction in lever arms in the caliper back with respect to tension struts of the brake caliper. Uneven wear of the brake pads is advantageously significantly reduced.

In yet another embodiment, the disc brake has a readjustment device which is inserted into a threaded tube. A compact construction is therefore made possible.

A brake caliper according to the invention of the above-described disc brake has a caliper back with a transverse section which extends parallel to the brake disc and at a right angle to the brake disc axis. On the side which faces the brake disc, the transverse section has a contact section carrier with at least one projection with the one contact surface of the at least one pair of contact surfaces.

A brake pad set according to the invention for the above-described disc brake has at least one application-side brake pad and at least one back-side brake pad, wherein the back-side brake pad has at least one recess for receiving a projection corresponding to the at least one recess.

In another embodiment, the brake pad set furthermore comprises a pad retaining clip, wherein the at least one application-side brake pad and the at least one back-side brake pad are each provided with a pad retaining spring. Simple installation and simple holding are therefore possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
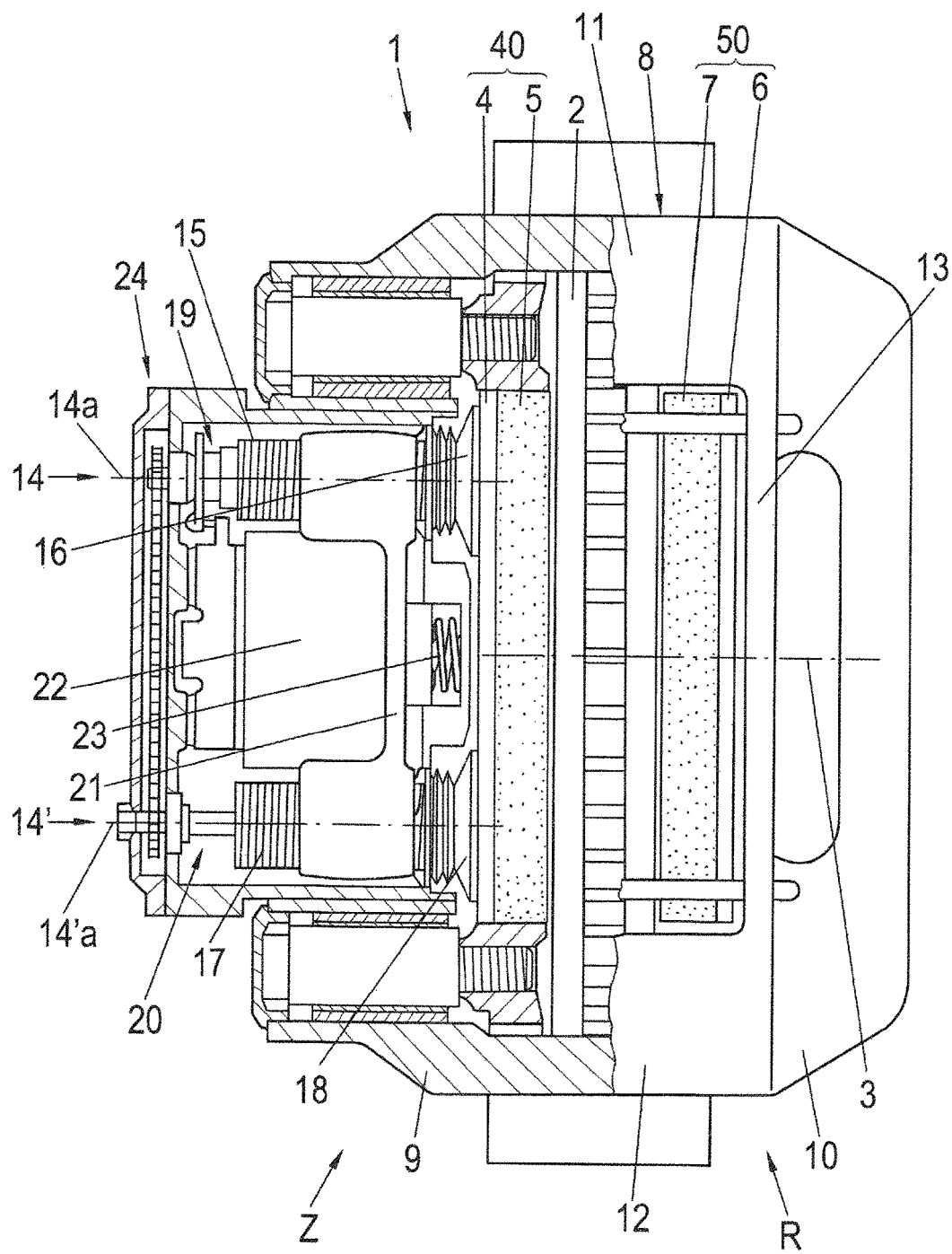
FIGS. 1 and 1A are schematic views of a conventional disc brake.
Figure 1A:
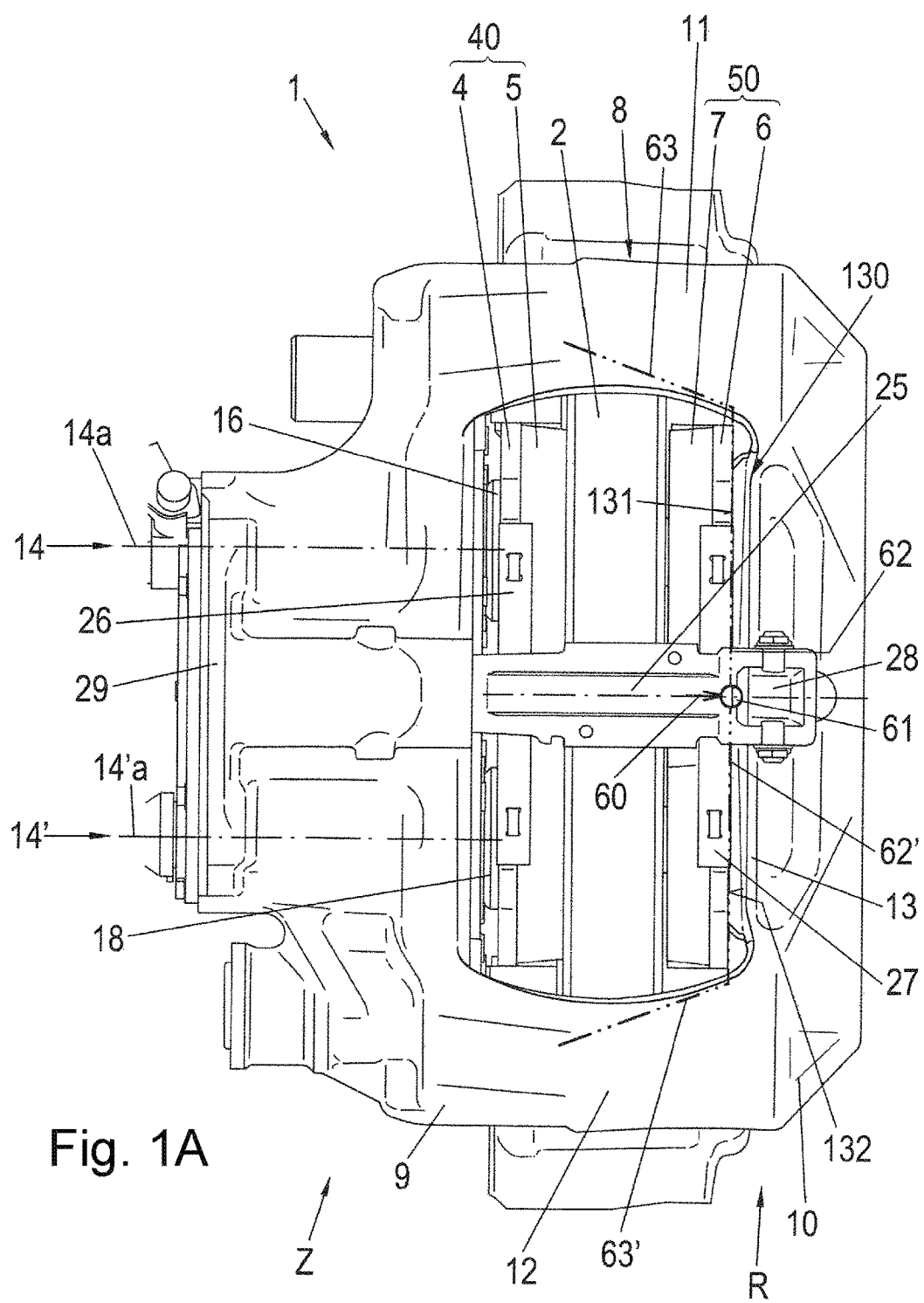
Figure 2:
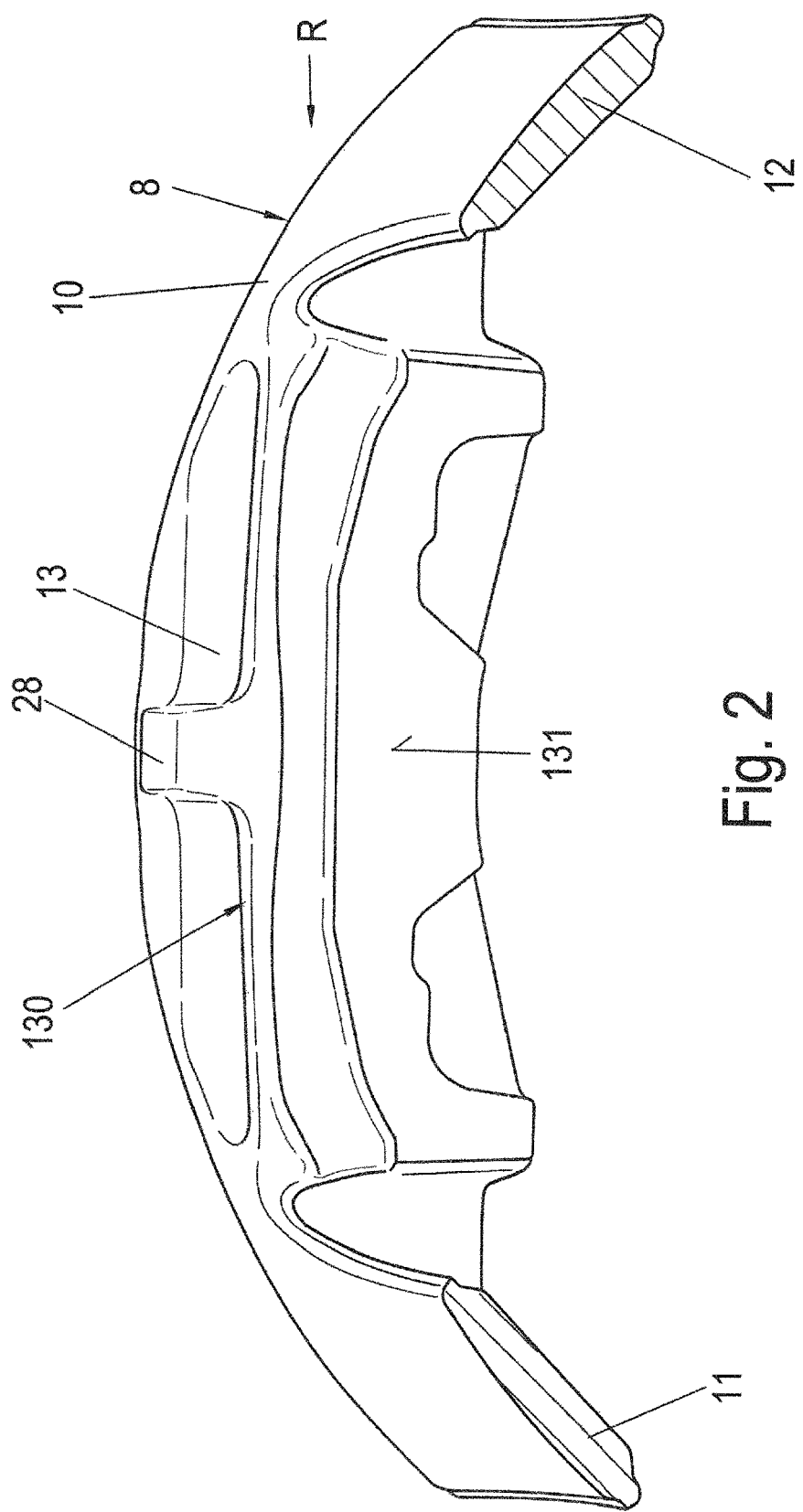
FIG. 2 is a schematic partial sectional view of a conventional brake caliper of the conventional disc brake according to FIG. 2.
Figure 3:
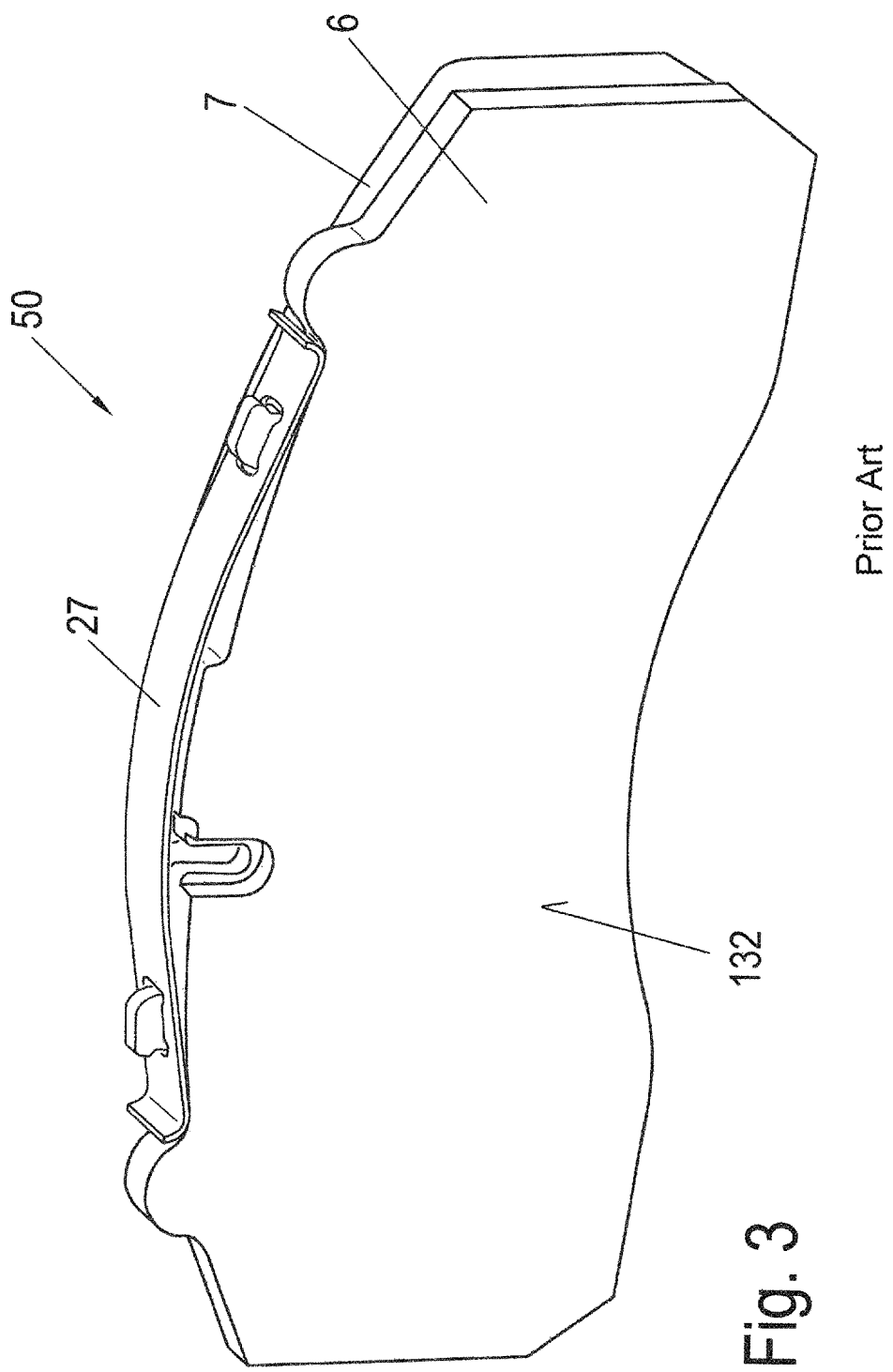
FIG. 3 is a schematic perspective view of a conventional brake pad of a conventional brake pad set of the conventional disc brake according to FIG. 2.

FIG. 1 shows a schematic partial sectional view of a conventional (customary) disc brake 1 in a top view. FIG. 1A illustrates a top view of the conventional disc brake 1. FIG. 2 shows a schematic partial sectional view of a conventional brake caliper 8 of the conventional disc brake 1 according to FIG. 1. FIG. 3 illustrates a schematic perspective view of a conventional back-side brake pad 50 of a conventional brake pad set of the disc brake 1 according to FIG. 1.

The disc brake 1 has a brake disc 2 with a brake disc axis 3. An application-side brake pad 40 which has of a brake pad carrier 4 and a friction pad 5 attached thereto is arranged on an application side Z of the brake disc 2. A further back-side brake pad 50 is arranged on a rear (back) side R of the brake disc 2. The back-side brake pad 50 also has a brake pad carrier 6 and a friction pad 7 attached thereto. The two brake pads 40 and 50 form a brake pad set.

A brake caliper 8, here embodied as a floating or sliding caliper, fits over the brake disc 2. The brake caliper 8 has an application section 9, a caliper back 10 and two tension struts 11, 12. The application section 9 is located on the application side Z and accommodates an application mechanism of the disc brake 1. The application mechanism is also explained below. The caliper back 10 is arranged on the back side R. The tension struts 11 and 12 are arranged over the brake disc 2 and run parallel to each other and to the brake disc axis 3. The application section 9 and the caliper back 10 are fixedly connected to each other by the tension struts 11, 12 and are formed therewith, for example, as an integral cast part.

The disc brake 1 is designed here as a two-plunger brake with two threaded tube units 14 and 14', each having a threaded tube 15, 17. The threaded tubes 15, 17 may also be referred to as threaded plungers, threaded spindles or pressure spindles. Axes of rotation of the threaded tube units 14, 14', which are arranged at the top in FIG. 1, are referred to here as center axes 14a, 14'a.

The application-side brake pad carrier 4 is connected to the threaded tubes 15, 17 of the threaded tube units 14, 14' by way of respective pressure pieces 16, 18. The pressure piece 16 is attached to one end of the threaded tube 15, and the pressure piece 18 is connected to one end of the threaded tube 17.

The back-side brake pad 50 is also referred to as the reaction-side brake pad 50 and is fixed in the brake caliper 8 by way of its brake pad carrier 6 on the other side of the brake disc 2, i.e. on the back side. That side of the brake pad carrier 6 which is not provided with the friction pad 7 is in contact here with the caliper back 10 via a transverse section 13. The transverse section 13 extends parallel to the brake disc 2 and at a right angle to the brake disc axis 3. On the side which faces the brake pad carrier 6 of the back-side brake pad 50, the transverse section 13 is provided with a contact section carrier 130 on which a contact surface 131 is arranged (also see FIG. 2), which contact surface is in contact with a contact surface 132 (also see FIG. 3) of the brake pad carrier 6 of the back-side brake pad 50.

The brake pads 40 and 50 are guided into receptacles (not shown) and retained via a pad retaining clip 25 (not described specifically). The pad retaining clip 25 is in contact with a respective pad retaining spring 26, 27 attached on the upper side of each brake pad carrier 4, 6. The pad retaining clip 25 is held here at an application-side end in a receptacle (not denoted) on the application section 9 of the brake caliper 8 and is fastened at its other, back-side end to the caliper back 10 of the brake caliper 8 by way of a pad retaining clip bearing 28. This is illustrated in FIG. 1A.

The threaded tubes 15, 17 each have an external thread and are each arranged rotatably in associated internal threads in a bridge 21. The bridge 21 is also referred to as a crosspiece.

The bridge 21, and thus also the threaded tubes 15, 17, are actuable by an application device, here a pivoted brake lever 22 with a pivot axis at right angles to the brake disc axis 3. The pivoted brake lever 22 has a lever body (not denoted specifically) which is in interaction with the bridge 21. The pivoted brake lever 22 is furthermore operatively connected here to a compressed air cylinder (not shown), wherein the compressed air cylinder is attached to a connection section 29 (FIG. 1A) of the brake caliper 8.

The bridge 21 is adjustable in the direction of the brake disc axis 3 by the pivoted brake lever 22. A movement toward the brake disc 2 is referred to as an application movement, and a movement in the opposite direction is referred to as a release movement. A return spring 23 is accommodated in a corresponding recess in the center of the bridge 21 on the pad side of the bridge 21 and is supported on the brake caliper 8. During the release movement, the bridge 21 is adjusted back into the released position of the disc brake 1 shown in FIGS. 1 and 1A by means of the return spring 23.

The disc brake 1 can have different power operating mechanisms. Here, for example, the pivoted brake lever 22 is actuated pneumatically. For details of the construction and operation of a pneumatic disc brake 1, attention is drawn to the corresponding description of DE 197 29 024 C1.

A clearance between the friction pads 5, 7 and the brake disc 2 in the released position is referred to as the release clearance. This release clearance increases as a result of pad and disc wear. If this is not compensated, the disc brake 1 cannot achieve its peak performance since an actuating stroke of the actuating mechanism, i.e. in this case the actuating stroke or a pivoting angle of the pivoted brake lever 22, is no longer sufficient.

In this example, a readjustment device 19 is inserted in the threaded tube 15 of the upper threaded tube unit 14, which is shown in FIG. 1, coaxially with the center axis 14$a$. The term "readjustment" should be taken to mean a reduction of the release clearance. The predefined release clearance is determined by the geometry of the disc brake 1 and has a "design release clearance". In other words, the readjustment device 19 reduces an existing release clearance to the desired value for the predefined release clearance if this existing release clearance is too large in relation to the predefined release clearance. A detailed description of such a readjustment device 19 is provided in DE 10 2004 037 771 A1.

The lower threaded tube unit 14' is provided with a driver 20 which is arranged coaxially with respect to the lower threaded tube unit 14', with respect to the threaded tube 17 thereof and the driver axis 14'$a$. The driver 20 is inserted here into the threaded tube 17 and is operatively connected thereto.

The center axes 14$a$, 14'$a$ and the brake disc axis 3 are arranged parallel to each other.

The readjustment device 19 is operatively connected to the pivoted brake lever 22 via a drive (not denoted specifically).

The readjustment device 19 and the driver 20 are coupled by a synchronization unit 24 in such a manner that a rotational movement of the threaded tube 15 about its center axis 14$a$ brings about a rotational movement of the threaded tube 17 about its center axis 14'$a$ and vice-versa. The synchronization unit 24 is not explained further here. With the latter, a synchronous movement of the threaded tubes 15 and 17 of the threaded tube units 14 and 14' during readjustment operations (and possibly return operations, depending on the type of readjustment device 19, which can also be configured for increasing a release clearance) and adjustments during maintenance work, for example brake pad changes (manual driving, for example, via an actuating end of the driver 20 or/and a driving section of the readjustment device 19) are ensured.

When the disc brake 1 is actuated, the required application force is produced via the pivoted brake lever 22, which is mounted eccentrically with respect to the threaded tube units 14, 14', and is transmitted to the bridge 21. The application force transmitted in this manner to the bridge 21 is then transmitted by the two threaded tube units 14, 14', by the threaded tubes 15, 17 thereof with the pressure pieces 16, 18, to the brake pad carrier 4 of the application-side brake pad 40 and also, via the brake caliper 8, to the brake pad carrier 6 of the back-side brake pad 50 and then to the brake disc 2. During this operation, the threaded tube units 14, 14' are moved in the direction of the brake disc 2. As soon as the application-side brake pad 40 is in contact by way of its friction pad 5 with the brake disc 2, the counter (reaction) force which arises also causes the brake caliper 8 to move with the back-side brake pad 50 in the direction of the brake disc 2 in the opposite direction to the direction of the application-side brake pad 40. As soon as the friction pad 7 of the back-side brake pad 50 also comes into contact with the brake disc 2, a braking action is produced.

The back-side brake pad 50 lies with its contact surface 132 against the contact surface 131 of the contact section carrier 130 of the transverse section 13 of the caliper back 10 of the brake caliper 8. The back-side brake pad 50 is shown in FIG. 3 with a view of its contact surface 132. The contact surface 132 is arranged on the outer side (which can clearly be seen here) of the brake pad carrier 6 of the back-side brake pad 50. The pad retaining spring 27 (not explained specifically) is attached on the upper side of the brake pad carrier 6.

The contact surface 131 of the caliper back 10 is produced by cutting, for example, by being milled. The contact surface 131 can clearly be seen in FIG. 2 and is approximately in the shape of the brake pad carrier 6 of the back-side brake pad 50. There is extensive contact of the contact surfaces 131 and 132 here. In contrast thereto, the application-side brake pad 40 is in contact by way of its brake pad carrier 4 with the pressure pieces 16, 18, which are arranged at a distance from each other, of the threaded tube units 14, 14'. During an application operation, imaginary force introduction lines run in parallel on both sides in the direction of the center axes 14a, 14'a at a distance from the brake disc axis 3.

The extensive support of the back-side brake pad 50 on the contact section carrier 130 of the transverse section 13 on the caliper back 10 of the brake caliper 8 produces a highly unfavorable leverage effect here during the introduction of force. For this purpose, an engagement point 61 of the introduction of force is shown in FIG. 1A by an arrow which is intended to indicate a counter force 60 of the back-side brake pad 50. Two lever arms 62, 62' are each illustrated by a chain-double-dotted line along the contact point of the contact surfaces 131 and 132. The two lever arms 62, 62' meet at the engagement point 61 which lies directly in a vertical plane of the brake disc axis 3, the vertical plane running perpendicularly to the plane of the drawing. The outer ends of the lever arm 62, 62' are each connected by a likewise chain-double-dotted line which in each case symbolizes a direction of tensile force 63, 63' running through the tension struts 11, 12. The length of each lever arm 62, 62' corresponds approximately to half the length of the transverse section 13 of the caliper back 10.

It can clearly be seen in FIG. 1A that the force introduction lines onto the application-side brake pad 40 run in the respective center axis 14a and 14'a, whereas the engagement point 61 in the case of the back-side brake pad 50 lies in the center between the center axes 14a and 14'a.

The two different force introduction forms can therefore have a negative effect causing an unequal wear of the brake pads 40, 50.

Figure 4:
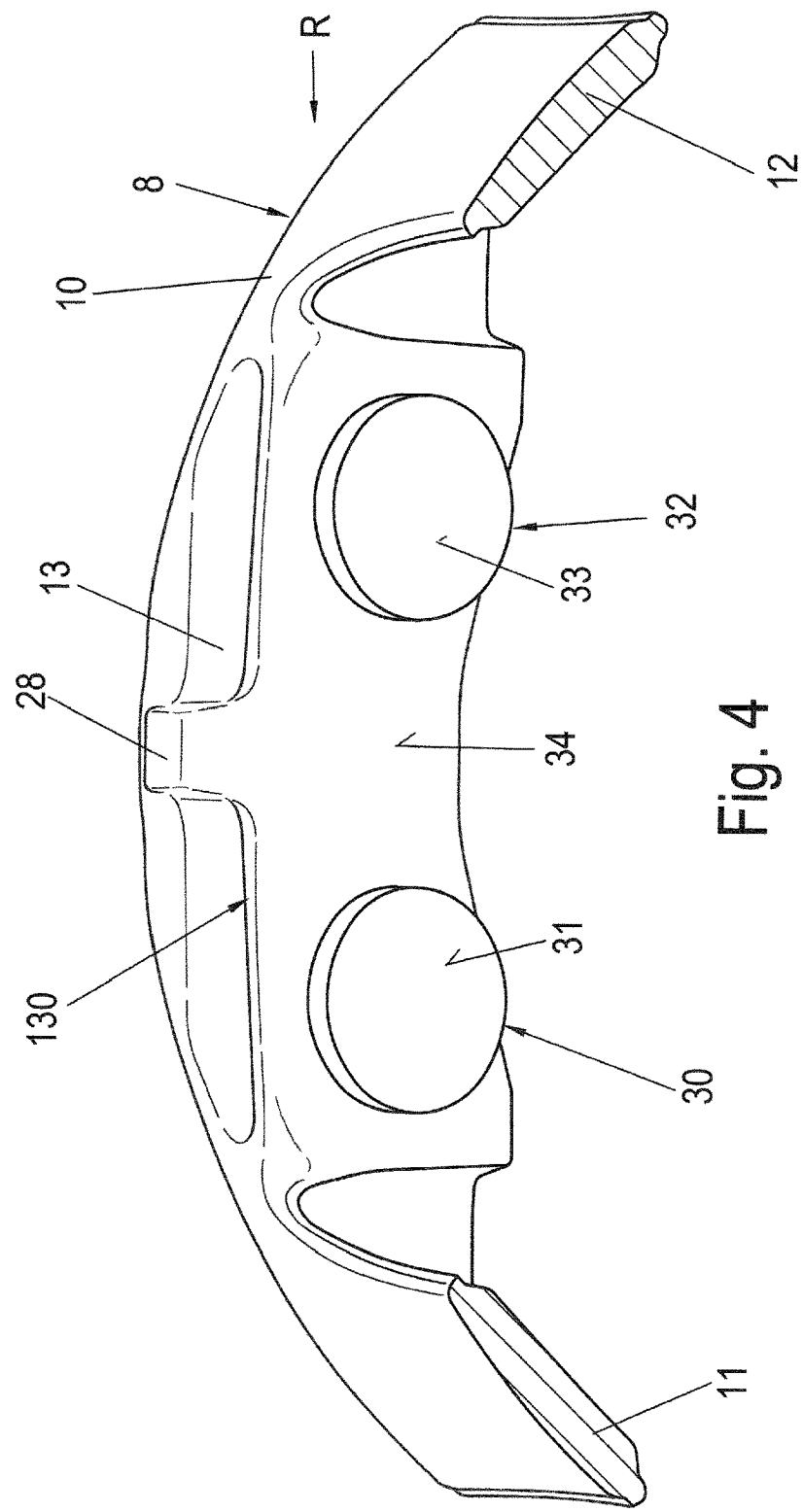
FIG. 4 is a schematic partial sectional view of an exemplary embodiment of a brake caliper according to the invention of a disc brake according to the invention.
Figure 5:
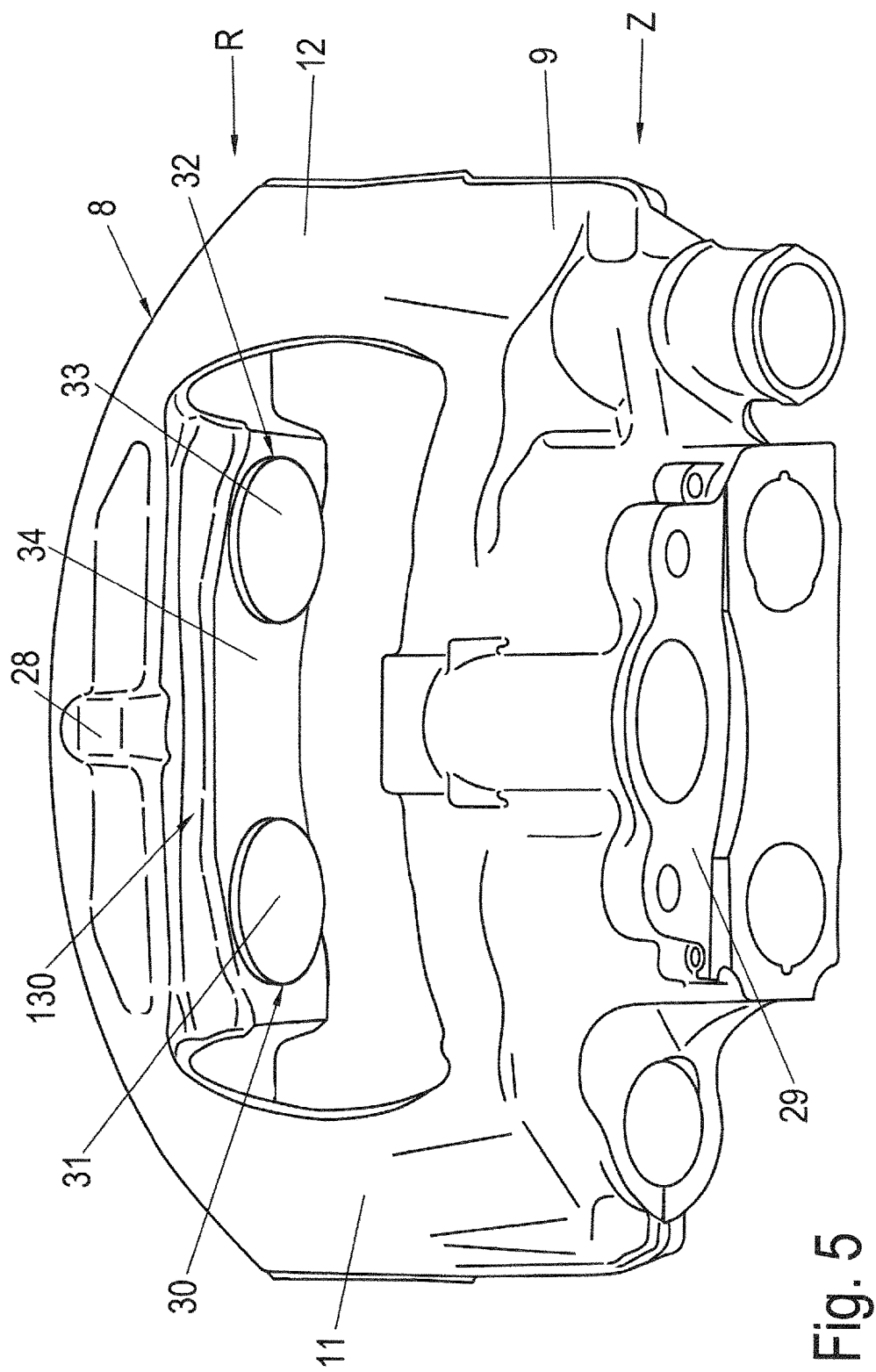
FIG. 5 is a schematic perspective view of the exemplary embodiment of the brake caliper according to the invention according to FIG. 4.
Figure 6:
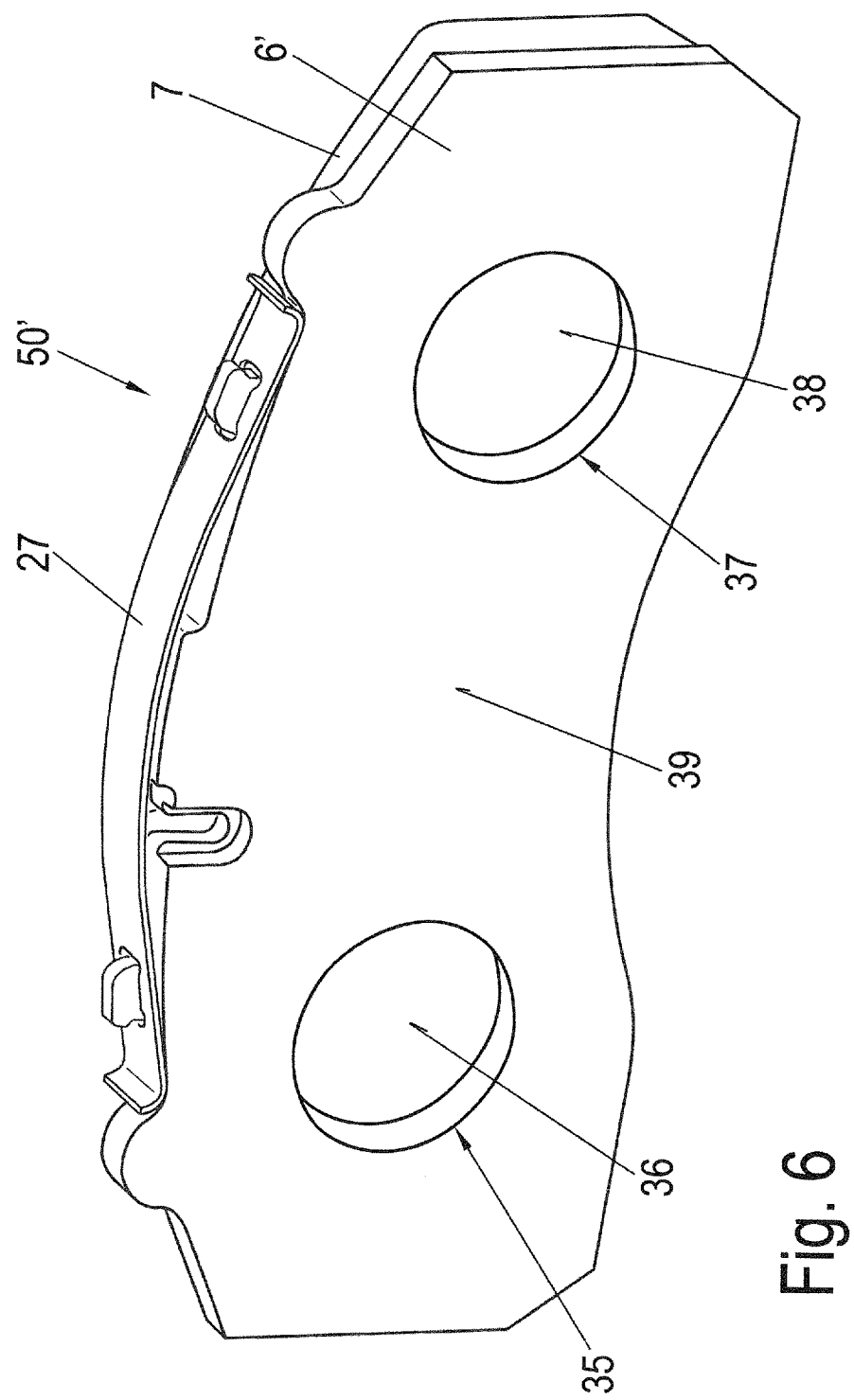
FIG. 6 is a schematic perspective view of a brake pad according to an embodiment of the invention.
Figure 7:
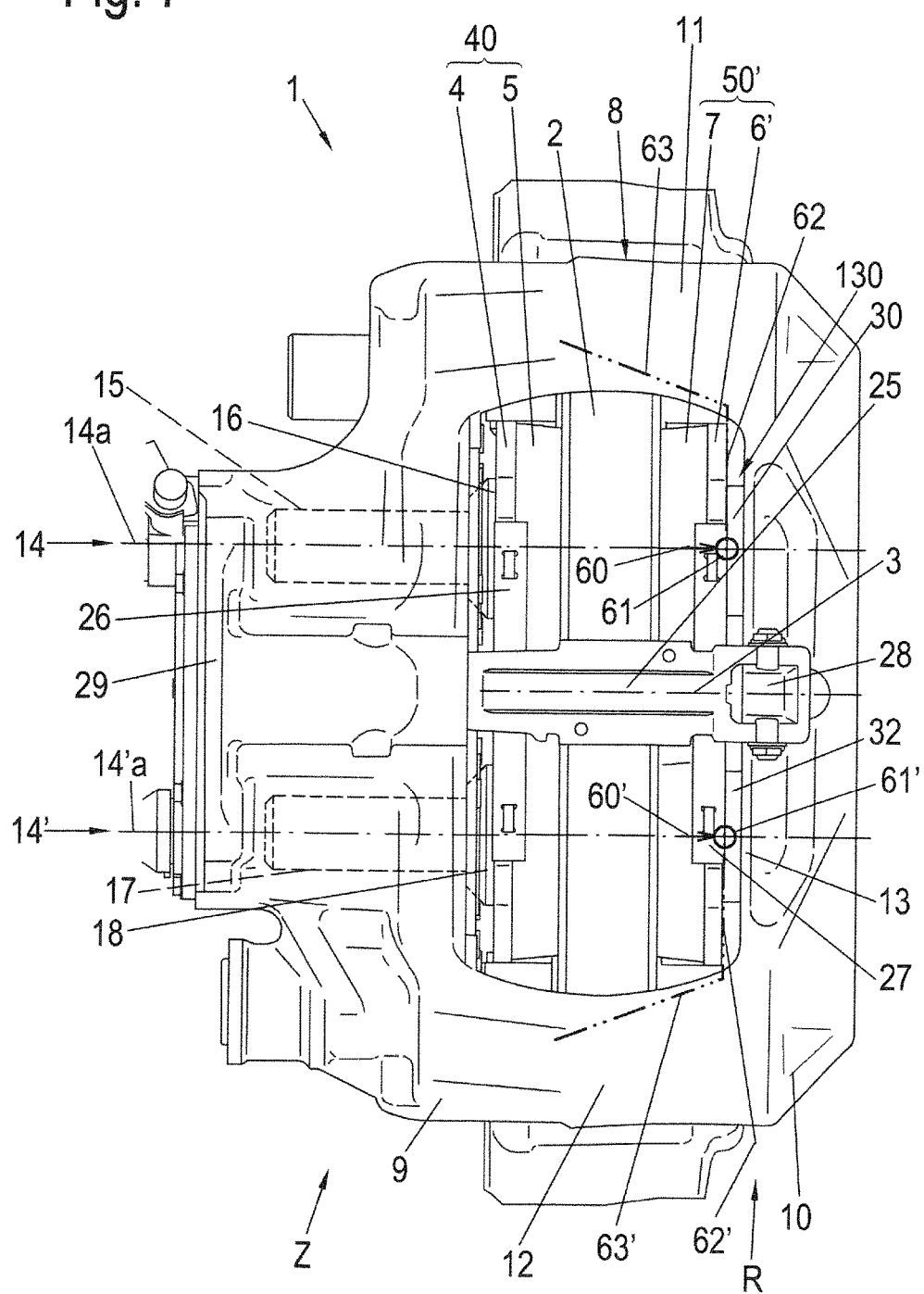
FIG. 7 is a schematic top view of an exemplary embodiment of a disc brake according to the invention with the brake caliper according to the invention according to FIG. 5 and with a brake pad set according to the invention.

FIG. 4 illustrates a schematic partial sectional view of an exemplary embodiment of a brake caliper 8 of a disc brake 1 according to the invention. FIG. 5 shows a schematic perspective view of the exemplary embodiment of the brake caliper 8 according to the invention according to FIG. 4, and FIG. 6 shows a schematic perspective view of an exemplary brake pad 50' according to the invention. Finally, FIG. 7 shows a schematic top view of an exemplary embodiment of a disc brake 1 according to the invention with the brake caliper 8 according to FIG. 5 and with a brake pad set including the brake pads 40 and 50'.

In contrast to the caliper back 10 of the conventional brake caliper 8 according to FIG. 2, the caliper back 10 of the brake caliper 8 according to FIG. 4 has a transverse section 13 with contact section carrier 130 having two projections 30, 32. These projections 30, 32 protrude from a free surface 34 in the direction of the brake disc 2. The projections 30, 32 are, for example, milled here from the contact section carrier 130 by, in this example, the free surface 34 having been produced by cutting outward away from the brake disc 2 in the direction of the brake disc axis 3. In contrast to the customary caliper back 10 according to FIG. 2, the free surface 34 does not form a contact surface for the back-side brake pad 50'.

The projections 30, 32 each have a contact surface 31, 33 on their end sides facing the brake disc 2. These two contact surfaces 31, 33 lie together in a plane. In this exemplary embodiment, the projections 30, 32 are circular-cylindrical domes and the contact surfaces 31, 33 are designed as circular surfaces. The projections 30, 32 are arranged on both sides at the same distance from the brake disc axis 3. In addition, the center lines of the circular contact surfaces 31, 33 each run coaxially with respect to the center axes 14a, 14'a of the threaded tube units 14, 14' of the application side. This can clearly be seen in FIG. 7. In other words, the center line of the threaded tube unit 14 is the center axis 14a and runs both as a center line through the pressure piece 16 of the application-side brake pad 40 and as a center line through the center point of the circular contact surface 31 of the projection 30 of the caliper back 10. And the center line of the threaded tube unit 14' runs as the center axis 14'a both as a center line through the pressure pieces 18 of the application-side brake pad 40 and as a center line through the center point of the circular contact surface 33 of the projection 32 of the caliper back 10.

FIG. 6 shows the associated back-side brake pad 50' with the brake pad carrier 6' and the friction pad 7. The outer back side of the brake pad carrier 6' has a free surface 39 which, however, in contrast to the customary brake pad according to FIG. 3, does not form a contact surface for the caliper back 10 of the brake caliper 8. In this example, circular-cylindrical recesses 35, 37 are molded into the free surface 39. Each recess 35, 37 has a circular contact surface 36, 38, which each form a bottom surface of the respective recess 35, 37. The circular-cylindrical recesses 35, 37 correspond to the circular-cylindrical projections 30, 32 of the caliper back 10 according to FIGS. 4 and 5.

In the installed state, the circular-cylindrical projections 30, 32 of the caliper back 10 of the brake caliper 8 are accommodated in a form-fitting manner in the circular-cylindrical recesses 35, 37 of the brake pad carrier 6' of the back-side brake pad 50'. The free surface 39 of the brake pad carrier 6' of the back-side brake pad 50' and the free surface 34 of the contact section carrier 130 of the caliper back 10 are not in contact here and also cannot come into contact. This can also be seen in FIG. 7.

In addition, the free surfaces 34, 39 advantageously permit a reduction in the weight of the brake caliper 8 and also of the entire disc brake 1.

The back-side brake pad 50' has the pad retaining spring 27 on the upper side of the brake pad carrier 6'. The friction pad 7 is applied on the side of the brake pad carrier 6' which lies opposite the outer back side with the recesses 35, 37 of the brake pad carrier 6'.

The free surface 34 of the contact section carrier 130 of the caliper back 10 is face-milled, wherein the outlay on the cutting machining remains unchanged with respect to the customary contact section carrier 130 of the customary caliper back 10 according to FIG. 2.

In the assembled state of the disc brake 1 that is shown in FIG. 7, the projections 30, 31 of the caliper back 10 of the brake caliper 8 are accommodated in the recesses 35, 37 of the brake pad carrier 6' of the back-side brake pad 50'. The circular contact surface 31 of the projection 30 of the caliper back 10 is in contact here with the circular contact surface 38 of the recess 37 of the brake pad carrier 6' of the back-side brake pad 50'. Similarly, the circular contact surface 33 of the projection 32 of the caliper back 10 is also in contact with the circular contact surface 36 of the recess 35 of the brake pad carrier 6' of the back-side brake pad 50'.

The contact pressure behavior of the back-side brake pad 50' and of the application-side brake pad 40 is thereby equalized since the imaginary force introduction lines in the case of the back-side brake pad 50 are aligned and coincide with the center lines 14a, 14'a and therefore with the imaginary force introduction lines of the threaded tube units 14, 14' in the case of the application-side brake pad 40.

For this purpose, the lever arms 62, 62' with their directions of tensile force 63, 63' are shown in FIG. 7. It can clearly be seen that, in contrast to the lever arm 62, 62' in the case of the customary disc brake 1 according to FIG. 1a, in the case of the disc brake 1 according to the invention shown in FIG. 7, two engagement points 61 and 61' each having an associated counter force 60, 60' are now present on the back-side brake pad 50. In comparison to the conventional disc brake 1 according to FIG. 1A, this furthermore results in shorter lever arms 62, 62', which are in each case approximately halved. This has a positive effect on the highly stressed tension struts 11, 12.

In addition, the projections 30, 32 of the caliper back 10, which projections are accommodated in a form-fitting manner in the recesses 35, 37 of the brake pad carrier 6' of the back-side brake pad 50', prevent twisting of the back-side brake pad 50'.

A brake pad set according to the invention of the disc brake 1 of FIG. 7 includes the application-side brake pad 40 and the back-side brake pad 50' which has the brake pad carrier 6' with the recesses 35, 37 for the projections 30, 32 of the caliper back 10. As a result, the brake pads 40, 50' can be installed without confusion. This is ensured by having the outer diameters of the pressure pieces 16, 18 larger than the outside diameters of the recesses 35, 37.

The above-described exemplary embodiments do not restrict the invention.

For example, the form of the projections 30, 32 and recesses 35, 37 can have an oval or/and polygonal cross section instead of a circular cross section transversely with respect to the center line. In the case of two or more projections 30, 32 of a corresponding number of recesses 35, 37, it may be possible for the cross sections of all of the projections 30, 32 and recesses 35, 37 to have an identical or different form, for example the cross sections of projection 30 and recess 37 are circular and of projection 32 and recess 35 are oval.

It is also contemplated for the brake pad carrier 4 of the application-side brake pad 40 to be provided with recesses for the pressure pieces 16, 18. The pressure pieces 16, 18 and the projections 30, 32 can have different diameters and/or forms in order for the brake pads 40, 50' to be installed without confusion.

The projections 30, 32 and the associated recesses 35, 37 can also be arranged in the reverse manner, i.e. the projections 30, 32 are arranged on the brake pad carrier 6', whereas the recesses 35, 37 are molded into the caliper back 10 of the brake caliper 8. A combination of a projection 30 and of a recess 37 on the brake pad carrier 6' is also contemplated, wherein the associated combination of projection 31 and recess 35 is arranged on the caliper back 10.

It is furthermore contemplated that, in the case of a single-plunger disc brake with only one threaded tube unit 14, 14', which is arranged centrally, i.e. above the brake disc axis 3 in a vertical plane of the brake disc axis 3 (the imaginary vertical plane of the brake disc axis 3, the vertical plane being perpendicular to the drawing of FIG. 7), the associated contact section carrier 130 of the caliper back 10 of the brake caliper 8 also has only one projection 30, 32 with a contact surface 31, 33. For this purpose, the associated brake pad carrier 6' of the back-side brake pad 50 is provided with only one central recess 35, 37 with a contact surface 36, 38. The center line of the only one threaded tube unit 14, 14' then runs through the center line of the only one contact surface 31, 33 of the caliper back 10.

LIST OF REFERENCE SIGNS

1 Disc brake
2 Brake disc
3 Brake disc axis
4, 6 Brake pad carrier
5, 7 Friction pad
8 Brake caliper
9 Application section
10 Caliper back
11, 12 Tension strut
13 Transverse section
14, 14' Threaded tube unit
14a, 14'a Center axis
15, 17 Threaded tube
16, 18 Pressure piece
19 Readjustment device
20 Driver
21 Bridge
22 Pivoted brake lever
23 Return spring
24 Synchronization unit
25 Pad retaining clip
26, 27 Pad retaining spring
28 Pad retaining clip bearing
29 Connection section
30, 32 Projection
31, 33 Contact surface
34 Free surface
35, 37 Recess
36, 38 Contact surface
39 Free surface
40 Application-side brake pad
50, 50' Back-side brake pad
60, 60' Counter force
61, 61' Engagement point
62, 62' Lever arm
63, 63' Direction of tensile force
130 Contact section carrier
131, 132 Contact surface
R Back side
Z Application side The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc, comprising:
a brake caliper that extends over the brake disc, the brake caliper having an application section and a caliper back, the application section and the caliper back being connected via tension struts;
two brake pads, each having a brake pad carrier for a friction material, one brake pad of the two brake pads being an application-side brake pad assigned to the application section of the brake caliper and another of the two brake pads being a back-side brake pad assigned to the caliper back of the brake caliper,
wherein
the brake pad carrier of the back-side brake pad and the caliper back of the brake caliper are in contact via a pair of contact surfaces,
one contact surface of the pair of contact surfaces is an end surface of a projection,
the other contact surface of the pair of contact surfaces is a bottom surface of a recess,
the pair of contact surfaces are circular, planar and are in the same plane, the pair of contact surfaces are co-axially aligned with respective brake application threaded tube units in the brake caliper application section, and an extent of a protrusion of the projection and a depth of the recess forming the other contact surface is such that a free surface of the caliper back is not in contact with the brake pad carrier of the back-side brake pad.

2. The disc brake according to claim 1, wherein the projection forming the one contact surface and the recess forming the other contact surface correspond with one another and interact with one another in a form-fitting manner in an installed state of the back-side brake pad in the brake caliper.

3. The disc brake according to claim 1, wherein the projection forming the one contact surface is integrally formed on the caliper back of the brake caliper, and the recess forming the other contact surface is molded into the brake pad carrier of the back-side brake pad.

4. The disc brake according to claim 3, wherein the projection forming the one contact surface protrudes from a machined free surface of the caliper back in a direction of the brake disc.

5. The disc brake according to claim 1, wherein the application device further comprises a pivotable brake lever.

6. The disc brake according to claim 1, further comprising:

a readjustment device inserted into the threaded tube.

7. The disc brake according to claim 1, wherein the disc brake is a pneumatically actuated disc brake for a motor vehicle.

8. The disc brake according to claim 7, wherein the brake caliper is a sliding caliper.

9. A brake pad set for a disc brake according to claim 1, comprising:

the application-side brake pad and the back-side brake pad, wherein the back-side brake pad has the recess forming the other contact surface of the pair of contact surfaces, which recess receives the projection forming the one contact surface of the pair of contact surfaces.

10. The brake pad set according to claim 9, wherein both the application-side brake pad and the back-side brake pad have a pad retaining spring arranged on an upper side thereof.

11. A brake caliper of a disc brake, comprising:

an application section;

a caliper back connected to the application section via tension struts, wherein the caliper back has a transverse section that extends parallel to a brake disc of the disc brake and at a right angle to a brake disc axis, the transverse section has a contact section carrier with at least one projection on a side facing the brake disc, the projection forming a circular and planar contact surface is configured to engage a corresponding contact recess on a brake pad carrier of a back-side brake pad arrangeable in the brake caliper such that a free surface of the caliper back is not in contact with the brake pad carrier of the back-side brake pad.

* * * * *